(12) United States Patent
Sen et al.

(10) Patent No.: US 12,306,874 B2
(45) Date of Patent: May 20, 2025

(54) REASONING BASED NATURAL LANGUAGE INTERPRETATION

(71) Applicant: INTERNATIONAL BUSINESS MACHINES CORPORATION, Armonk, NY (US)

(72) Inventors: Jaydeep Sen, Bangalore (IN); Sumit Bhatia, New Delhi (IN); Ayushi Dalmia, Kolkata (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 17/011,446

(22) Filed: Sep. 3, 2020

(65) Prior Publication Data

US 2022/0067102 A1  Mar. 3, 2022

(51) Int. Cl.
*G06F 16/9032* (2019.01)
*G06F 40/20* (2020.01)
(Continued)

(52) U.S. Cl.
CPC ........ *G06F 16/90332* (2019.01); *G06F 40/20* (2020.01); *G06N 3/02* (2013.01);
(Continued)

(58) Field of Classification Search
CPC .. G06F 16/90332; G06F 40/20; G06F 40/211; G06F 40/284; G06F 40/30;
(Continued)

(56) References Cited

U.S. PATENT DOCUMENTS 8,117,023 B2   2/2012   Funakoshi et al.
10,235,358 B2  3/2019   Tur
(Continued)

FOREIGN PATENT DOCUMENTS

CN   109710737 A    5/2019
EP   3614297 A1    2/2020
(Continued)

OTHER PUBLICATIONS

International Search Report and Written Opinion, International Application No. PCT/CN2021/115657, International Filing Date Aug. 31, 2021.
(Continued)

*Primary Examiner* — Michael Colucci
(74) *Attorney, Agent, or Firm* — Stephen R. Yoder; Nicholas A. Welling

(57) ABSTRACT

A natural language processing approach for generating domain specific reasoning-based meaning representations. The approach may include receiving a user query via structured or unstructured data. The approach may also include generating a structured query from the user query using domain specific ontology and universal facts. Further, the approach many include the structured query may be analyzed to determine if the structured query has been assigned consistent concepts, properties and actions. Additionally, the approach may involve correcting the structured query if it is determined the structured query is inconsistent with the domain ontology and the universal facts.

6 Claims, 7 Drawing Sheets

(51) Int. Cl.
*G06N 3/02* (2006.01)
*G06N 5/02* (2023.01)
*G10L 15/22* (2006.01)

(52) U.S. Cl.
CPC ............... *G06N 5/02* (2013.01); *G10L 15/22* (2013.01); *G10L 2015/223* (2013.01)

(58) Field of Classification Search
CPC ..... G10L 15/22; G10L 2015/223; G06N 3/02; G06N 5/02
See application file for complete search history.

(56) References Cited

U.S. PATENT DOCUMENTS

| | | | |
|---|---|---|---|
| 11,138,205 B1* | 10/2021 | Mohajer | G06F 16/2455 |
| 2009/0024385 A1 | 1/2009 | Hirsch | |
| 2011/0060587 A1* | 3/2011 | Phillips | G10L 15/30 704/235 |
| 2015/0154178 A1* | 6/2015 | Fang | G06F 16/215 704/9 |
| 2016/0085799 A1* | 3/2016 | Kim | G06F 16/242 707/765 |
| 2016/0147737 A1 | 5/2016 | Ryu | |
| 2016/0188573 A1 | 6/2016 | Tang | |
| 2018/0039692 A1 | 2/2018 | Wang | |
| 2018/0114142 A1* | 4/2018 | Mueller | G06F 16/906 |
| 2018/0137420 A1 | 5/2018 | Byron | |
| 2019/0171714 A1* | 6/2019 | Gale | G16H 40/20 |
| 2019/0212879 A1 | 7/2019 | Anand | |
| 2020/0057811 A1 | 2/2020 | Seegan | |
| 2020/0073983 A1 | 3/2020 | Sen | |
| 2020/0167557 A1* | 5/2020 | Rahul | G06V 30/413 |
| 2021/0073596 A1* | 3/2021 | Bezzubtseva | G06N 7/005 |
| 2021/0233008 A1* | 7/2021 | Gupta | G06Q 50/02 |
| 2022/0121936 A1* | 4/2022 | Sui | G06N 3/04 |

FOREIGN PATENT DOCUMENTS

| | | |
|---|---|---|
| JP | 2008-146150 A | 6/2008 |
| JP | 2019-525272 A | 9/2019 |
| WO | 2017/223035 A1 | 12/2017 |
| WO | 2022048535 A1 | 3/2022 |

OTHER PUBLICATIONS

"Abstract Meaning Representation", Wikipedia, last edited on Mar. 2, 2020, 1 page, <https://en.wikipedia.org/wiki/Abstract_Meaning_Representation>.

"Semantic Parsing | NPL-progress", NLP-progress, downloaded from the internet on Sep. 1, 2020, 5 pages, <http://nlpprogress.com/english/semantic_parsing.html>.

Banarescu et al., "Abstract Meaning Representation for Sembanking", Proceedings of the 7th Linguistic Annotation Workshop & Interoperability with Discourse, Aug. 8-9, 2013, pp. 178-186, Sofia, Bulgaria.

Kamath et al., "A Survey on Semantic Parsing", Automated Knowledge Base Construction (2019), arXiv:1812.00978v3 [cs.CL], May 29, 2019, 22 pages.

Lukovnikov et al., "Translating Natural Language to SQL using Pointer-Generator Networks and How Decoding Order Matters," arXiv:1811.05303v1 [cs.AI], Nov. 13, 2018, 9 pages.

Japan Patent Office, "Notice of Reasons for Refusal," Jan. 28, 2025, 14 Pages, JP Application No. 2023-514792.

* cited by examiner

REASONING BASED NATURAL LANGUAGE INTERPRETATION

BACKGROUND OF THE INVENTION

The present invention relates generally to word meaning representation in natural language processing models and more specifically, to reasoning-based meaning representation for domain specific natural language processing interpretation.

Natural language processing has changed the landscape of user interactions with computing devices. Many natural language processing models can determine the general syntactic structures of sentences, as well as the general semantic structure within a domain agnostic model. Many models translate natural language queries and commands into structured formats, which can then be translated into executable forms to generate responses to the queries and commands.

SUMMARY

Embodiments of the present disclosure include a computer-implemented method and a computer system for generating domain specific reasoning-based word representations. An embodiment of the invention may comprise transforming a query into a structured proposal and generate a reasoning-based meaning representation of the structured proposal.

In another embodiment of the invention may include a computer-implemented method and a computer system and may comprise identifying, by a processor, quantitative data and qualitative features of unstructured data. Generating a query based on the identified quantitative data and/or qualitative data. Transforming the query into a structured proposal and generating a reasoning-based-meaning representation for the structured query.

Additionally, another embodiment of the invention may include a computer-implemented method and a computer system and may comprise receiving a natural language query, wherein the query is text based. Transforming the query into a structured proposal and generating a reasoning-based representation for the structured proposal.

The above summary is not intended to describe each illustrated embodiment of every implementation of the present disclosure.

Figure 1:
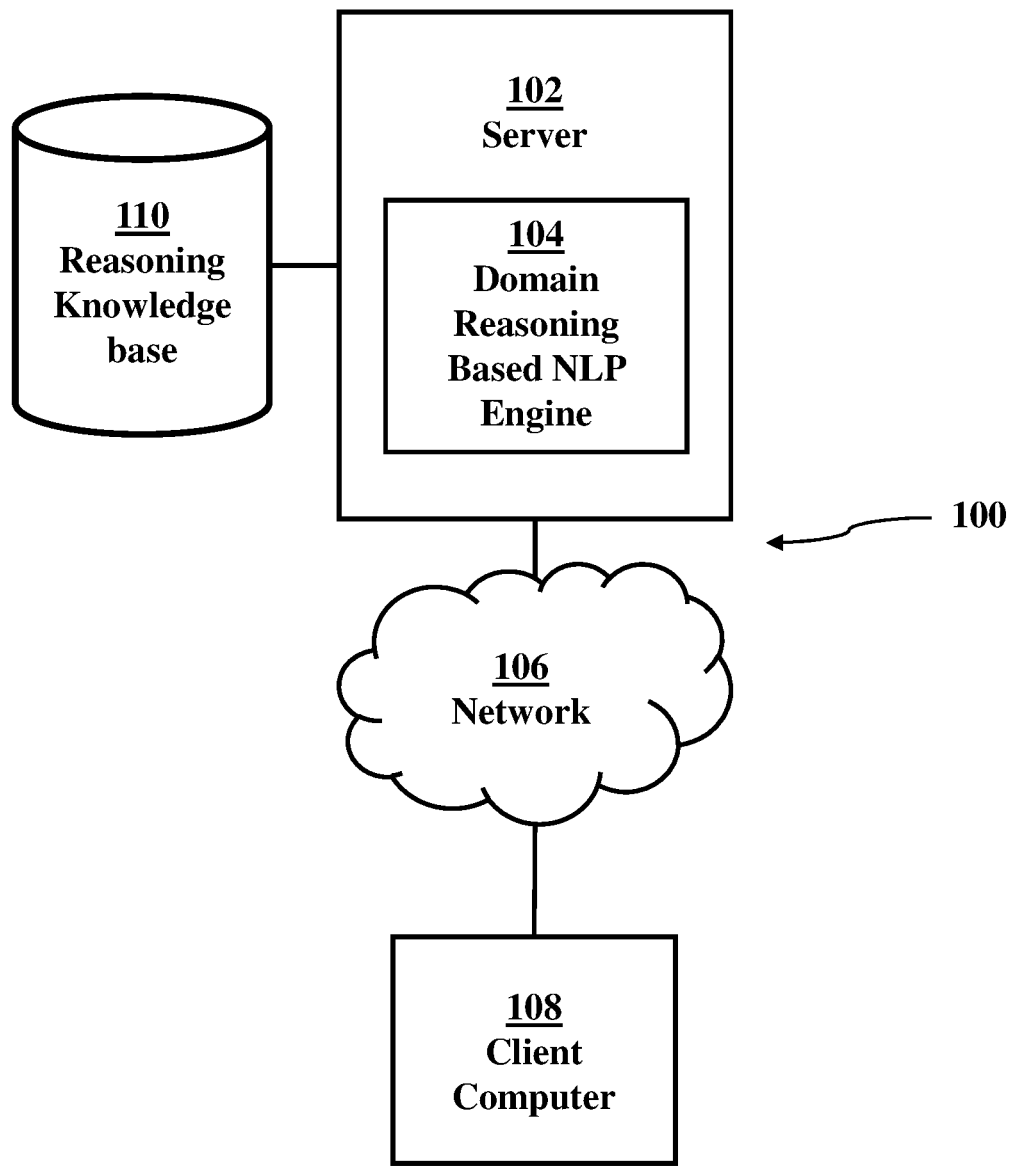
FIG. 1 is a functional block diagram generally depicting a domain specific reasoning-based meaning representation generation environment 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of reasoning-based meaning representation for domain specific natural language interpretation.

In an embodiment of the present invention, a query can be transformed into a structured proposal. The structured proposal can be analyzed for consistency and if it is determined the structured proposal is inconsistent, the structured proposal can be corrected, resulting in a structured proposal with a reasoning-based domain specific representation.

In additional embodiments, unstructured data containing a text-based query can be received. An imaging recognition model can extract the text-based query and additional (qualitative and/or quantitative) data from the unstructured data. The query and additional data can be preprocessed by a natural language preprocessing system for consumption by a structured proposal generator. The structured proposal generator can assign reasoning-based meaning representation to the preprocessed query based on a corpus stored by a domain specific reasoning knowledge base resulting in a structured proposal. The structured proposal can be analyzed for consistent meaning representation within the domain. If it is determined the structured proposal is inconsistent, the structured proposal can be corrected to be consistent, based on domain specific corrective axioms.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

FIG. 1 is a functional block diagram depicting, generally, a domain specific reasoning-based meaning representation generation environment 100. Domain specific reasoning-based meaning representation generation environment 100 comprises domain reasoning-based natural language processing (NLP) engine 104 operational on server 102, and network 106 supporting communications between the server 102 and client computer 108. As shown in FIG. 1, client computer 108 can access domain reasoning-based natural language processing engine 104 via network 106. While only one client computer 108 is shown in domain specific reasoning-based meaning representation generation environment 100, this is for ease of description, as multiple client computers can be within the domain specific reasoning-based meaning representation generation environment 100 (i.e. 1, 2, n . . . n+1).

Server 102 and client computer 108 can be a standalone computing device, a management server, a web server, a mobile computing device, or any other electronic device or computing system capable of receiving, sending, and processing data. In other embodiments, server 102 and client computer 108 can represent a server computing system utilizing multiple computers as a server system. It should be noted, while one server is shown in FIG. 1, domain specific reasoning-based meaning representation generation environment 100 can have any number of servers (e.g. 1, 2, n . . . n+1). In another embodiment, server 102 and client computer 108 can be a laptop computer, a tablet computer, a netbook computer, a personal computer, a desktop computer, or any programmable electronic device capable of communicating with other computing devices (not shown) within a domain specific reasoning-based meaning representation generation environment 100 via network 106.

In another embodiment, server 102 and client computer 108 represent a computing system utilizing clustered computers and components (e.g., database server computers, application server computers, etc.) that can act as a single pool of seamless resources when accessed within domain specific reasoning-based meaning representation generation environment 100. Servers 102 and client computer 108 can include internal and external hardware components, as depicted and described in further detail with respect to FIG. 6.

Domain reasoning-based NLP engine 104 can be a module for receiving one or more user queries, transforming the user queries into a structured proposal, determining if the structured proposal is consistent (described further below), correcting inconsistent structured proposals, and sending the consistent proposals to a question/answer engine for downstream applications (described further below). It should be noted, FIG. 1 shows domain reasoning-based NLP engine 104 operational on only one computing device, in some embodiments domain reasoning-based NLP engine 104 may be operational on one or more computing devices or within a cloud computing system. Domain reasoning-based NLP engine 104 may perform some actions described above on the same or different computing systems simultaneously or in sequence.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between servers 102 and client computer 108.

Reasoning knowledge base 110 is stored on server 102. In some embodiments, reasoning knowledge base 110 can contain the domain specific ontology and universal facts. Domain specific ontology is the categories and concepts associated with a domain, for example, in finance the concepts may include debt, lending, bankruptcy, stocks, bonds, etc. In another example, biology concepts can include, cell, mitosis, meiosis, chromosomes, bacteria, invertebrates, etc. Domain specific ontology can be user configured or sourced from various locations or databases. Universal facts capture facts associated with logical reasoning or common sense reasoning that is true for any domain. For example, a numeric comparison (e.g. more than/less than) or numeric aggregations (e.g. average, sum, maximum, minimum etc.) can apply only on a numeric property.

Another example of a universal fact is for any natural language query asking to retrieve top entities must also mention a ranking criterion in which to rank the entities. The set of universal facts to be captured in the reasoning knowledgebase is configurable for the use case and user. Universal facts can be from numerous sources, including user configuration, and abstract meaning representation (AMR) sembank. It should be noted, reasoning knowledge base 110 may contain more than one specific domain ontology. A different domain ontology may be triggered by specific words within a query.

In some embodiments, reasoning knowledge base 110 can contain detection axioms and action axioms. Detection axioms can determine if structured proposals are semantically valid. For example, if a numeric aggregation like SUM is applied on a "concept" such as "person", it is detected by detection axioms and corrected by correction axioms to convert it to SUM over "person's" "salary" which is a numeric property. In an additional example, a time comparison is mentioned for non-date property such as person's address it is detected and corrected as comparison with some date time property like person's year of lease. Thus, detection and correction axioms together enforce the semantic validity of meaning representations in natural language interpretations.

Figure 2:
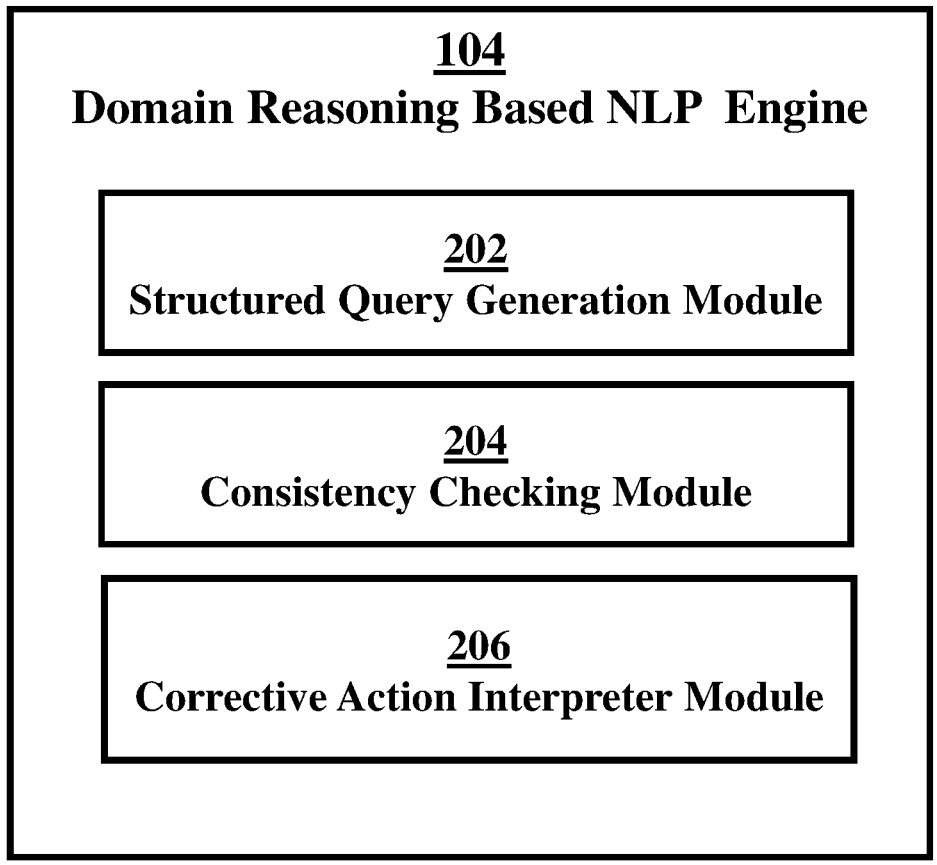
FIG. 2 is a functional block diagram depicting a domain specific reasoning-based natural language processing engine, in accordance with an embodiment of the present invention.

FIG. 2 is a functional block diagram 200 of domain reasoning-based NLP engine 104. Structured query generation module 202, consistency checking module 204, and corrective action interpreter module 206 are shown operational within domain reasoning-based NLP engine 104.

Structured query generation module 202 can be a computer module capable of receiving a natural language query and transforming the query into a structured proposal. A natural language query can be in spoken form or text form (either constructed from structured data or identified from unstructured data). Additionally, a query can be a question, statement, command, or any word or combination of words in a human understood language. A structured proposal can be a reasoning-based meaning representation of a natural language query. A natural language processing model may preprocess a spoken query or text query using various methods (described further below in FIG. 4) including, but not limited to, tokenization, stemming, lemmatization, part-of-speech tagging, removing accented characters, expanding contractions, removing special characters, removing stop words, named entity recognition, shallow parsing, and sentence chunking. In some embodiments, natural language processing can assign semantic meaning to words using various methods, for example, word embedding (Word2Vec, GloVe, bag-of-words . . . etc.) and abstract meaning representation. In some embodiments, structured query generation module 202 can assign meaning representation to words based on domain ontology and universal facts stored in reasoning knowledge base 110. For example, domain ontology can contain the domain specific concepts and the associated properties or facts for the concept, that would otherwise be unknown by the meaning representation assignment methods without the domain ontology. Universal facts stored in reasoning knowledge base 110 can act as a bridge between "domain ontology" and "assigning actions" that can be performed in regard to a property. In some embodiments, universal facts can be general concepts that are not domain specific but have a universal meaning representation.

In some embodiments, structured query generation module 202 can utilize the universal facts and domain ontology simultaneously in a natural language processing flow. For example, a user may ask the query (e.g. spoken, typed into via an input/output mechanism, or identified in unstructured data by optical character recognition) "which company has the higher stock price, company A or company B?" structured query generation module 202 can preprocess the query placing it in condition to allow a meaning representation to be assigned to the query. Structured query generation module 202 can be triggered to utilize the financial domain ontology from reasoning knowledge base 110 based on the presence of the word "stock" in the query. The word "stock" can be a concept with numerous properties assigned to it, for example, stock may be assigned the property "value," "market cap," "volume," "yearly dividend," "abbreviated name," the market where the stock is traded, and analyst assessment of buy/sell/hold. In some embodiments, concepts may have key properties which are automatically assigned, unless an additional word or words are detected within the query. For example, value may be the default property assigned to the concept of stock, but if the word assessment is detected then a characteristic property can be assigned. Structured query generation module 202 can utilize the universal facts stored in reasoning knowledge base 110 to recognize that the property of value is a measurable property. Additional properties can include aggregation of a measurable property, ranking of a property, counting a property, or duration if the property is related to time.

Consistency checking module 204 may be a computer module that can determine if structured query generation module 202 has assigned the correct concepts for identified actions and the correct property to the identified concept in the structured proposal. For example, if a user types in the query "are cheetahs faster than tigers?" structured query generation module 202 identifies the terms "are" and "faster" and then assigns the concept of "velocity" and the action of "ranking." However, structured query generation module 202 incorrectly assigns the property of "aggregation." In some embodiments, consistency checking module 204 identifies the incorrect property assignment based on reasoning axioms stored in reasoning knowledge base 110. The reasoning axioms are universal rules that can be preprogrammed or dynamically learned via a machine learning method such as clustering, transfer learning, reinforcement learning, or classification. In the above example, the reasoning axiom would be the rules associated with the action of ranking, which could be triggered by the word "than" in association with the concept of "velocity". Aggregation would not be within the properties allowable for the action of ranking, causing consistency checking module 204 to identify the structured proposal as inconsistent. In some embodiments, consistency checking module 204 would send the inconsistent proposal to corrective action interpreter module 206.

If consistency checking module 204 determines there are no inconsistencies within the structured query, then consistency checking module 204 can send the consistent structured proposal to a question/answer engine, because the structured query already has a consistent reasoning-based meaning representation. In other embodiments, consistency checking module 204 can send the consistent structured proposal for the query to a downstream application for further processing.

Corrective action interpreter module 206 may be a computer module capable of assigning properties and concepts to inconsistent proposals based on corrective axioms stored in reasoning knowledge base 110. Corrective axioms are domain specific rules which instruct corrective action interpreter module 206 to change properties for an inconsistent structured proposal into a consistent structured proposal for the identified concepts and actions. As described in the above example, consistency checking module 204 identified the incorrect property of aggregation assigned to the concept of "velocity" and rather than the action of ranking. Corrective action interpreter module 206 can use the corrective axiom associated with the action "ranking" and further narrow the corrective action for the concept "velocity," thus providing the property of "measuring" rather than the incorrect property of "aggregation." The corrected structured proposal results in an explicit meaning for the query. In some embodiments, corrective action interpreter module 206 can send the structured proposal to a question/answer engine.

Figure 3:
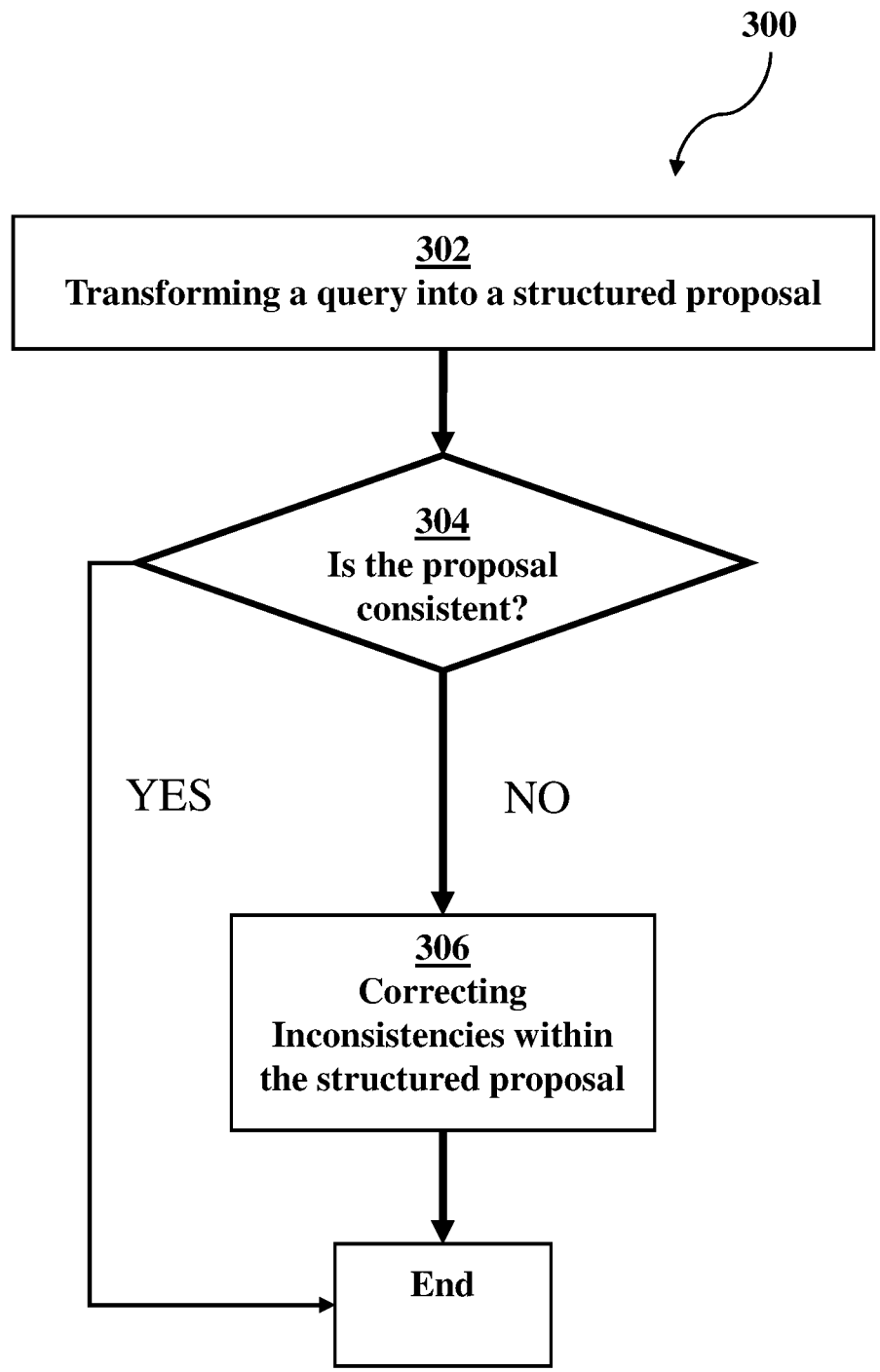
FIG. 3 is a flowchart of a method for generating a domain specific reasoning-based meaning representation generation, in accordance with an embodiment of the present invention.

FIG. 3 is a flowchart depicting operational steps of a method for generating a domain specific reasoning-based meaning representation 300. At step 302, a query can be transformed into a structured proposal. In some embodiments, a query can be transformed into a structured proposal by structured query generation module 202. In some embodiments, the query can be a spoken natural language query from a user. The query can be translated into a machine-readable format by a speech recognition module 426 (FIG. 4) within structured query generation module 202. For example, the spoken natural language query resulting from the spoken request can be translated into machine readable format via acoustic modelling using hidden markov models. In other embodiments, a query can be in the form of text (either in a structured data form or unstructured data form). In unstructured data form, natural language processing can use imaging recognition or character recognition to differentiate and consume the unstructured data. In some embodiments, structured query generation module 202 can use various techniques (explained further below) to assign a meaning representation to the query, resulting in the structured proposal. For example, in some embodiments, the isolated words within a query can be assigned a concept and further assigned a property within the concept, based on a domain specific subgraph stored within reasoning knowledge base 110.

At step 304, consistency checking module 204 determines if the structured proposal from structured query generation module 202 is consistent. In some embodiments, consistency checking module 204 can use reasoning axioms stored in reasoning knowledge base 110 to determine if correct concepts have been assigned to known domain specific vocabulary for a given identified action. Further, in some embodiments, consistency checking module can determine if the properties assigned to concepts within the structured proposal are correct based on reasoning axioms stored in reasoning knowledge base 110. For example, if a measurement property is assigned to a concept that can only have a quantitative property assigned to it for the identified action, consistency checking module 204 can identify the inconsistent proposal. In some embodiments, if consistency checking module 204 determines the structured proposal is consistent, i.e., the structured proposal has been assigned the correct reasoning-based meaning representation and thus has explicit meaning for the selected domain, then the analysis ends.

At step 306, corrective action interpreter module 206 can change the inconsistency identified by consistency checking module 204. In some embodiments, corrective action interpreter module 206 can use corrective axioms to assign the correct concept, property, and or action to an identified structured proposal. In some embodiments, the corrective axiom may be specific instructions to retransform the entire query with the incorrectly assigned concept or property removed from the possible assignments. In other embodiments, if there are multiple concepts identified within the query and assigned to the structured proposal, the corrective axioms can be specific instructions to reassign only the concept or property based on instructions within the corrective axiom.

Figure 4:
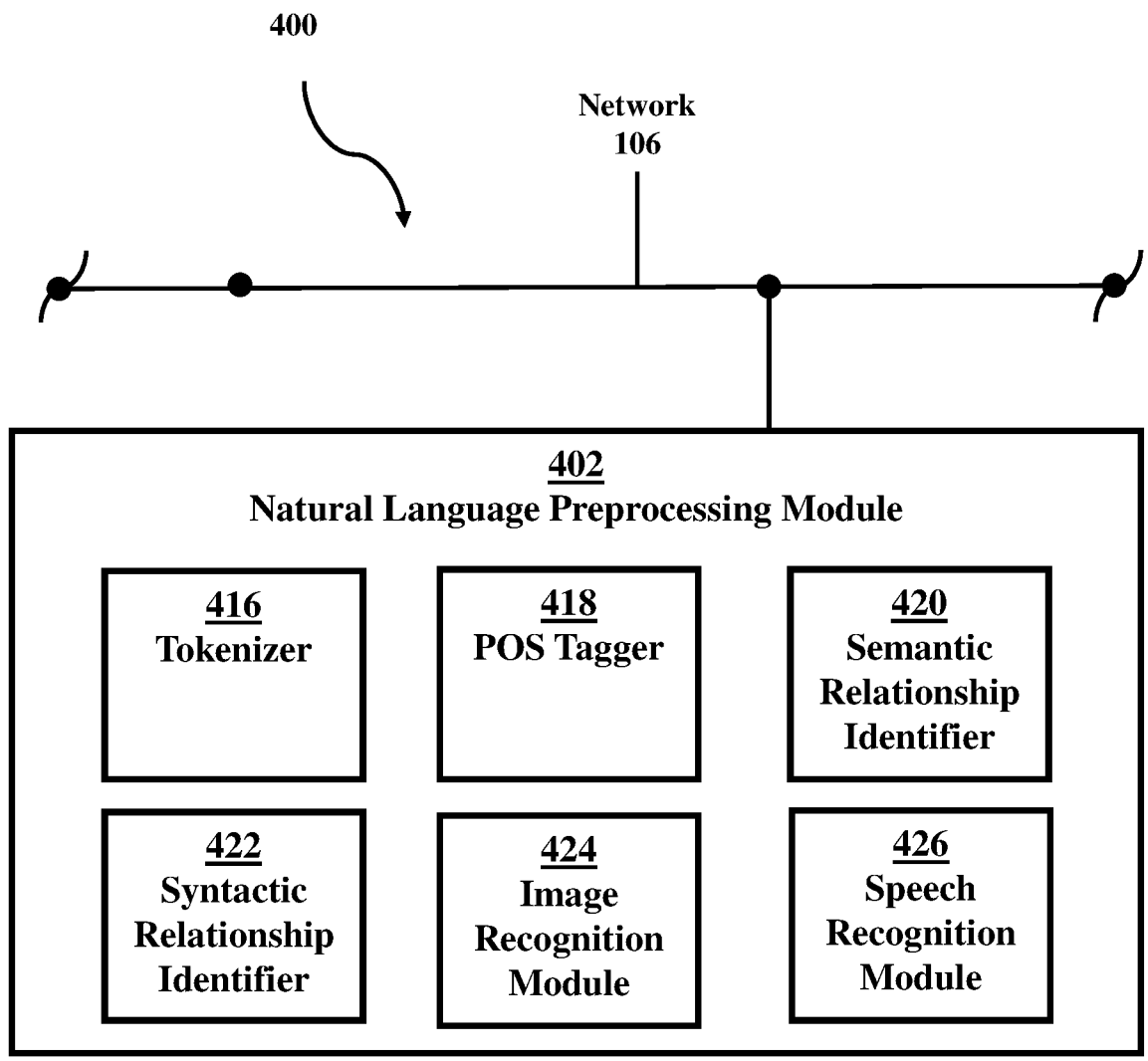
FIG. 4 is a functional block diagram of an exemplary natural language preprocessing system, in accordance with an embodiment of the present invention.

FIG. 4 is an exemplary natural language preprocessing system 400 configured to preprocess natural language queries, in accordance with an embodiment of the present invention. Natural language preprocessing module 402 may be operational within domain reasoning-based NLP engine 104, structured query generation module 202, or it may be a stand-alone system in communication with domain reasoning-based NLP engine 104 via network 106. In some embodiments, domain reasoning-based NLP engine 104 may send a query to be analyzed to the natural language preprocessing module 402. Further, a query (e.g. spoken, text, or unstructured data) may be directly received by natural language preprocessing module 402. Additionally, natural language preprocessing module 402 can send a preprocessed query to structured query generation module 202.

The natural language preprocessing module 402 may perform various methods and techniques for preprocessing a natural language query (e.g., syntactic analysis, semantic analysis, etc.). The natural language preprocessing module 402 may be configured to recognize and analyze any number of natural languages. In some embodiments, natural language preprocessing module 402 may group one or more sections of a query into one or more subdivisions. Further, natural language preprocessing module 402 may include various modules to perform analyses of a query. These modules may include, but are not limited to, a tokenizer 416, a part-of-speech (POS) tagger 418 (e.g., which may tag each of the one or more sections in which the particular subject is identified), a semantic relationship identifier 420, a syntactic relationship identifier 422, an image recognition module 424 (which may identify natural language queries and additional information from unstructured data), and a speech recognition module 426.

In some embodiments, the tokenizer 416 may be a computer module that performs lexical analysis. The tokenizer 416 may convert a sequence of characters into a sequence of tokens. A token may be a string of characters included in a recording and categorized as a meaningful symbol. Further, in some embodiments, the tokenizer 416 may identify word boundaries in a query and break any text within the query into component text elements, such as words, multiword tokens, numbers, and punctuation marks. In some embodiments, the tokenizer 416 may receive a string of characters, identify the lexemes in the string, and categorize them into tokens.

Consistent with various embodiments, the POS tagger 418 may be a computer module that marks up a word in a query to correspond to a particular part of speech. The POS tagger 418 may read a passage or other text in natural language and assign a part of speech to each word or other token. The POS tagger 418 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed event error text descriptions. Examples of parts of speech that may be assigned to words include, but are not limited to, nouns, verbs, adjectives, adverbs, and the like. Examples of other part of speech categories that POS tagger 418 may assign include, but are not limited to, comparative or superlative adverbs, wh-adverbs, conjunctions, determiners, negative particles, possessive markers, prepositions, wh-pronouns, and the like. In some embodiments, the POS tagger 418 may tag or otherwise annotate tokens of an event error text description with part of speech categories. In some embodiments, the POS tagger 418 may tag tokens or words of a query to be parsed by the natural language preprocessing module 402.

In some embodiments, the semantic relationship identifier 420 may be a computer module that may be configured to identify semantic relationships of recognized subjects (e.g., words, phrases, images, etc.) in a query. In some embodiments, the semantic relationship identifier 420 may determine functional dependencies between entities and other semantic relationships.

Consistent with various embodiments, the syntactic relationship identifier 422 may be a computer module that may be configured to identify syntactic relationships in a query composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

Image recognition module 424 may be a computer module that can be configured to recognize text within unstructured data. For example, in some embodiments, image recognition module 424 can be a computer module with a neural network capable of scanning pixels of a document (medical journal article, medical data within a slide presentation, medical report in a word processor, etc.) to recognize various fonts and handwritten characters, using various models including pattern matching, pattern recognition, image correlation, etc. Further, in some embodiments image recognition module 424 may be a neural network configured to recognize and predict the following letter within an unstructured data document, also known as nearest neighbor classifier, for example Cuneiform and Tesseract.

Speech recognition module 426 is a computer module configured to receive a spoken natural language query and transform it into a computer readable format. In an embodiment, an acoustic model may change a spoken natural language query into wave format or phonemes. The wave format or phonemes can be translated into characters associated with the respective wave format or phoneme. Speech recognition module 426 may also have predictive capabilities to ensure correct characters or words are assigned to a wave format or phonemes based on a previously identified object. For example, using a statistical model (e.g. hidden markov model) the potential words following an identified word can narrow down the words that must be searched to identify the phoneme or wave form.

Figure 5:
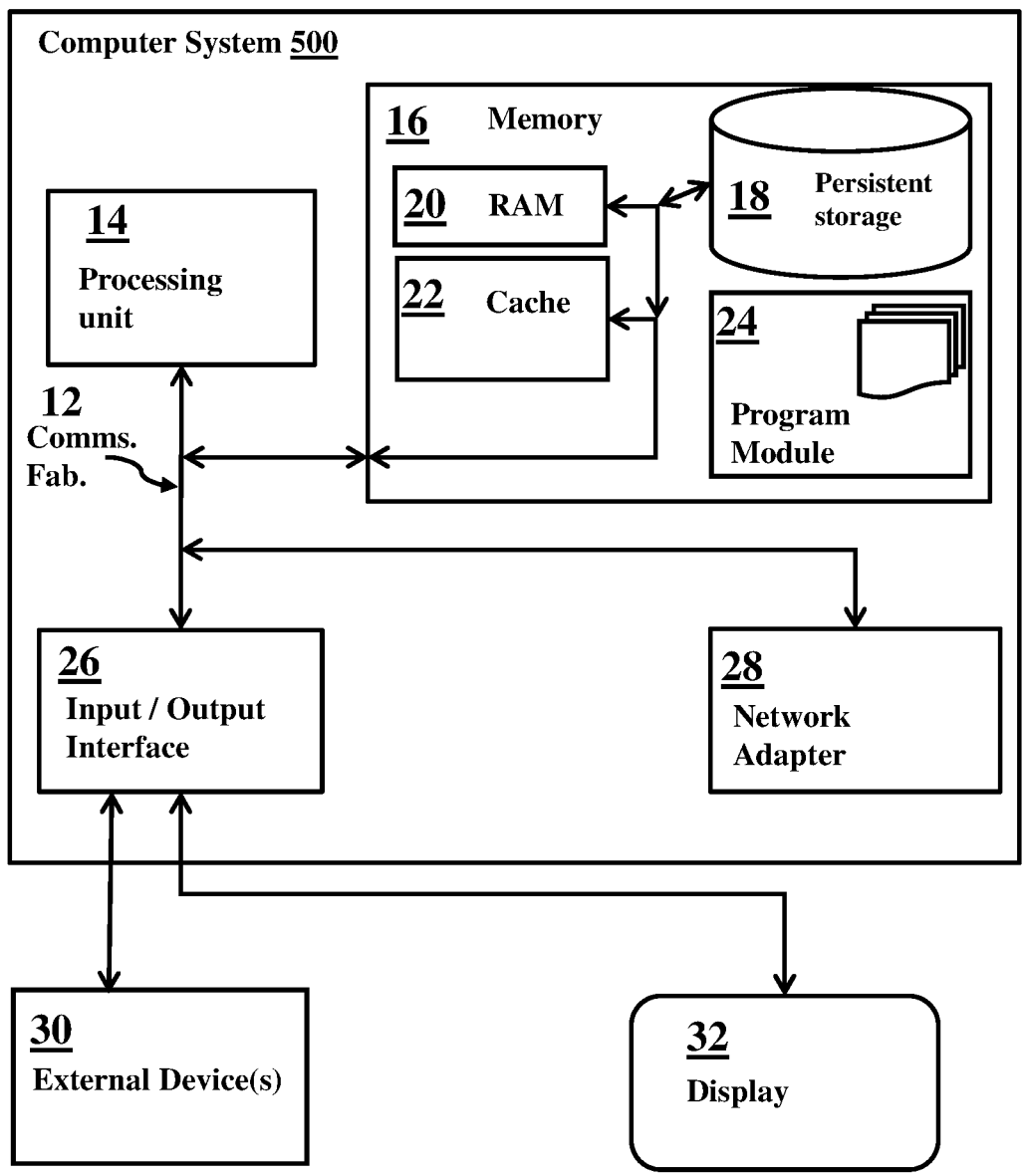
FIG. 5 is a functional block diagram of an exemplary computing system within a computing system event error diagnosis environment, in accordance with an embodiment of the present invention.

FIG. 5 depicts computer system 500, in accordance with a computing device in at least one embodiment of the invention. Computer system 500 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In this embodiment, memory 16 includes random access memory (RAM) 20, cache 22 and program module 24. In general, memory 16 can include any suitable volatile or non-volatile computer readable storage media. Cache 22 is a fast memory that enhances the performance of processors 14 by holding recently accessed data, and data near recently accessed data, from memory 16.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface(s) 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
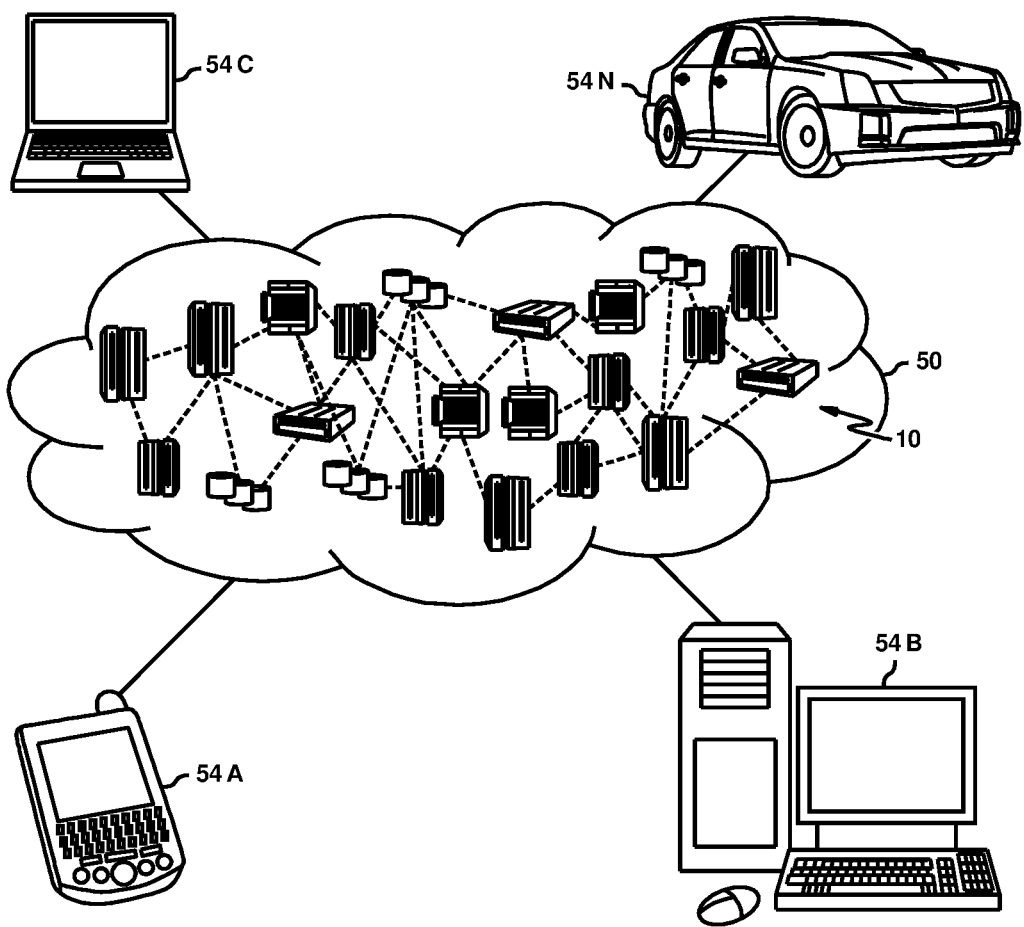
FIG. 6 is a diagram depicting a cloud computing environment, in accordance with an embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
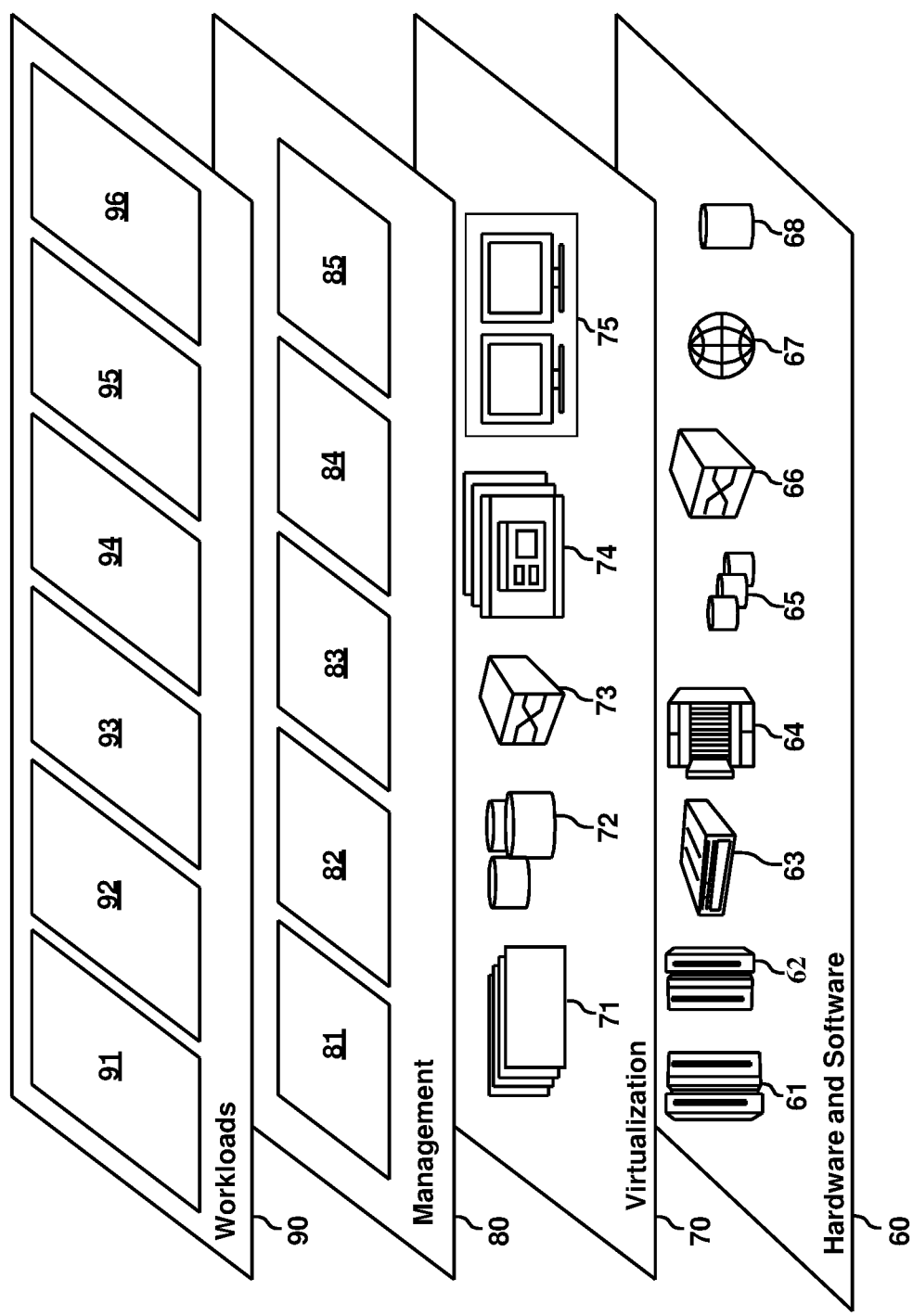
FIG. 7 is a functional block diagram depicting abstraction model layers, in accordance with an embodiment of the present invention.

FIG. 7 is a block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and domain specific reasoning-based meaning representation generation 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a domain specific reasoning-based meaning representation of a query, the computer-implemented method comprising:
    receiving, by a processor, a query from a user, wherein the query is handwritten text contained in unstructured data;
    scanning a plurality of pixels in the unstructured data, based on a neural network associated with an image recognition module;
    predicting, by the processor, a plurality of letters, based on the scanning;
    identifying, by the processor, a plurality of words from the predicted plurality of letters, based on pattern matching or pattern recognition;
    tokenizing, by the processor, each identified word in the query, based on a natural language processing system;
    transforming, by the processor, the query into a structured proposal, based on each of the tokenized words; and
    generating, by the processor, a reasoning-based meaning representation of the structured proposal, wherein generating the reasoning-based meaning representation of the structured proposal comprises identifying one or more concepts associated with the structured proposal and assigning one or more properties to each of the one or more identified concepts, wherein the one or more properties are based, at least in part, on universal facts, and recognizing whether the one or more properties is one of the following: a measurable property, an aggregation of a measurable property, a ranking of a property, a counting of a property, and a temporal relation property;

determining, by the processor, if the structured proposal is consistent, based on a domain reasoning knowledge base and the reasoning-based meaning representation; and responsive to determining the structured proposal is not consistent, correcting, by the processor, the structured proposal.

2. The computer-implemented method of claim 1, further comprising:

sending, by the processor, the reasoning-based meaning representation to a question/answer engine.

3. A computer system for generating a domain specific reasoning- based meaning representation of a query, the system comprising:

a processor;

a computer readable storage media; and computer program instructions stored on the computer readable storage media to cause the processor to perform one or more operations, the computer program instructions including instructions to:

receive a query from a user, wherein the query is handwritten text contained in unstructured data;

scan a plurality of pixels in the unstructured data, based on a neural network associated with an image recognition module;

predict a plurality of letters, based on the scanning;

identify a plurality of words from the predicted plurality of letters, based on pattern matching or pattern recognition;

tokenize each identified word in the query based on a natural language processing system;

embed each token based on the natural language processing system;

transform the query into a structured proposal, based on each of the tokenized words;

transform a query into a structured proposal;

generate a reasoning-based meaning representation for the structured proposal, wherein generating the reasoning-based meaning representation of the structured proposal comprises identifying one or more concepts associated with the structured proposal and assigning one or more properties to each of the one or more identified concepts, wherein the one or more properties are based, at least in part, on universal facts, and recognizing whether the one or more properties is one of the following: a measurable property, an aggregation of a measurable property, a ranking of a property, a counting of a property, and a temporal relation property;

determine if the structured proposal is consistent, based on a domain reasoning knowledge base and the reasoning-based meaning representation; and responsive to determining the structured proposal is not consistent program, correct the structured proposal.

4. The computer system of claim 3, the computer program instructions further comprising instructions to:

send the reasoning-based meaning representation to a question/answer engine.

5. A computer program product for generating a domain specific reasoning-based meaning representation of a query, the computer program product comprising a computer readable storage device comprising one or more program instructions executable by a processor, the computer program instruction comprising:

program instructions to receive a query from a user, wherein the query is handwritten text contained in unstructured data;

program instructions to scan a plurality of pixels in the unstructured data, based on a neural network associated with an image recognition module;

program instructions to predict a plurality of letters, based on the scanning;

program instructions to identify a plurality of words from the predicted plurality of letters, based on pattern matching or pattern recognition;

program instructions to tokenize each identified word in the query based on a natural language processing system;

embed each token based on the natural language processing system;

program instructions to transform the query into a structured proposal, based on each of the tokenized words;

program instructions to generate a reasoning-based meaning representation for the structured proposal, wherein generating the reasoning-based meaning representation of the structured proposal comprises identifying one or more concepts associated with the structured proposal and assigning one or more properties to each of the one or more identified concepts, wherein the one or more concepts are based, at least in part, on universal facts, and recognizing whether the one or more properties is one of the following: a measurable property, an aggregation of a measurable property, a ranking of a property, a counting of a property, and a temporal relation property;

program instructions to determine if the structured proposal is consistent, based on a domain reasoning knowledge base and the reasoning-based meaning representation; and responsive to determining the structured proposal is not consistent, program instructions to correct the structured proposal.

6. The computer program product of claim 5, the computer program instruction further comprising:

program instructions to send the reasoning-based meaning representation to a question/answer engine.

* * * * *